US012144101B2

(12) United States Patent
Biloiu et al.

(10) Patent No.: US 12,144,101 B2
(45) **Date of Patent: *Nov. 12, 2024**

(54) RESONATOR, LINEAR ACCELERATOR CONFIGURATION AND ION IMPLANTATION SYSTEM HAVING ROTATING EXCITER

(71) Applicant: Applied Materials, Inc., Santa Clara, CA (US)

(72) Inventors: Costel Biloiu, Rockport, MA (US); David T. Blahnik, Round Rock, TX (US); Wai-Ming Tam, Manchester-by-the-Sea, MA (US); Charles T. Carlson, Cedar Park, TX (US); Frank Sinclair, Boston, MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,128

(22) Filed: Sep. 26, 2023

(65) Prior Publication Data

US 2024/0032183 A1 Jan. 25, 2024

Related U.S. Application Data

(63) Continuation of application No. 17/506,185, filed on Oct. 20, 2021, now Pat. No. 11,812,539.

(51) Int. Cl.

| | |
|---|---|
| ***H05H 7/02*** | (2006.01) |
| ***H05H 7/12*** | (2006.01) |
| ***H05H 9/00*** | (2006.01) |

(52) U.S. Cl.
CPC ................ *H05H 7/02* (2013.01); *H05H 7/12* (2013.01); *H05H 9/00* (2013.01); *H05H 2007/025* (2013.01)

(58) Field of Classification Search
None
See application file for complete search history.

(56) References Cited

U.S. PATENT DOCUMENTS 4,712,042 A 12/1987 Hamm
4,884,809 A * 12/1989 Rowan .................... F41B 15/04 42/1.16

(Continued)

FOREIGN PATENT DOCUMENTS

JP 6093399 B2 3/2017
KR 101757920 B1 5/2011

(Continued)

OTHER PUBLICATIONS

L.C. Thevenin, Academie des Scienecs 97 (1883) 159, 10 pages.

(Continued)

*Primary Examiner* — Srinivas Sathiraju
(74) *Attorney, Agent, or Firm* — KDW FIRM PLLC

(57) ABSTRACT

An exciter for a high frequency resonator. The exciter may include an exciter coil inner portion, extending along an exciter axis, an exciter coil loop, disposed at a distal end of the exciter coil inner portion. The exciter may also include a drive mechanism, including at least a rotation component to rotate the exciter coil loop around the exciter axis.

20 Claims, 9 Drawing Sheets

(56) References Cited

U.S. PATENT DOCUMENTS

| | | | | | |
|---|---|---|---|---|---|
| 1,937,329 | A * | 11/1993 | Sydney | F16J 15/0887 285/113 |
| 5,504,341 | A * | 4/1996 | Glavish | H01J 37/3171 315/505 |
| 6,208,095 | B1 | 3/2001 | Divergilio | |
| 6,544,193 | B2 * | 4/2003 | Abreu | A61B 3/185 600/558 |
| 7,157,868 | B2 | 1/2007 | Brown | |
| 10,553,959 | B2 * | 2/2020 | Vannucci | H01Q 19/22 |
| 10,553,960 | B2 * | 2/2020 | Vannucci | H01Q 1/38 |
| 11,362,438 | B2 * | 6/2022 | Henry | H01Q 1/46 |
| 11,456,771 | B1 * | 9/2022 | Bennett | H04B 1/40 |
| 11,482,397 | B1 * | 10/2022 | Chaney | H01J 37/08 |
| 11,812,539 | B2 * | 11/2023 | Biloiu | H05H 7/02 |
| 2002/0049389 | A1 * | 4/2002 | Abreu | A61B 3/0058 600/318 |
| 2007/0123809 | A1 * | 5/2007 | Weiss | A61B 5/073 601/84 |
| 2010/0137712 | A1 * | 6/2010 | Krag | A61B 17/32053 600/431 |
| 2010/0137713 | A1 * | 6/2010 | Krag | A61B 17/32053 600/7 |
| 2014/0239953 | A1 | 8/2014 | Luong | |
| 2015/0065837 | A1 * | 3/2015 | Abreu | A61P 27/02 604/300 |
| 2015/0085249 | A1 * | 3/2015 | Abreu | A61P 27/02 351/205 |
| 2017/0076908 | A1 * | 3/2017 | Buff | H01J 37/14 |
| 2017/0258320 | A1 * | 9/2017 | Abreu | A61B 5/416 |
| 2021/0210307 | A1 * | 7/2021 | Biloiu | H01J 37/3171 |
| 2022/0139691 | A1 * | 5/2022 | Likhanskii | H01J 27/16 250/288 |
| 2022/0148843 | A1 * | 5/2022 | Biloiu | H01J 37/08 |
| 2022/0174810 | A1 * | 6/2022 | Biloiu | H05H 7/22 |
| 2022/0183137 | A1 * | 6/2022 | Sinclair | H05H 9/042 |
| 2022/0248523 | A1 * | 8/2022 | Sinclair | H05H 7/02 |
| 2022/0319806 | A1 * | 10/2022 | Murphy | H01J 37/08 |
| 2023/0021619 | A1 * | 1/2023 | Lu | H01J 37/023 |
| 2023/0089170 | A1 * | 3/2023 | Carlson | H05H 7/22 315/505 |
| 2023/0120769 | A1 * | 4/2023 | Blahnik | H05H 7/22 315/505 |
| 2023/0124350 | A1 * | 4/2023 | Biloiu | H05H 9/00 315/505 |
| 2024/0032183 | A1 * | 1/2024 | Biloiu | H05H 9/00 |
| 2024/0064888 | A1 * | 2/2024 | Vopat | H05H 7/18 |

FOREIGN PATENT DOCUMENTS

| | | | | |
|---|---|---|---|---|
| TW | I234419 B | | 6/2005 | |
| TW | 201230159 A | | 7/2012 | |
| WO | WO-02067688 A1 | * | 9/2002 | A61B 3/0025 |

OTHER PUBLICATIONS

E.B. Rosa and F.W. Grover, Bulletin of the Bureau of Standards, 8 issue 1, (1912) pp. 6-7.

F.E. Terman, Radio Engineers Handbook, McGraw-Hill, New York and London, (1943), pp. 58-59.

International Search Report and Written Opinion for the International Application No. PCT/US2022/041686, mailed Dec. 19, 2022, 7 pages.

Taiwanese Search Report for Application No. 111132951 dated Oct. 13, 2023.

International Preliminary Report on Patentability in International Application No. PCT/US2022/041686, mailed May 2, 2024, 6 pages.

* cited by examiner

RESONATOR, LINEAR ACCELERATOR CONFIGURATION AND ION IMPLANTATION SYSTEM HAVING ROTATING EXCITER

CROSS-REFERENCE TO RELATED APPLICATIONS

This application is a continuation of U.S. patent application Ser. No. 17/506,185, filed Oct. 20, 2021, the entirety of which is incorporated herein by reference.

FIELD OF THE DISCLOSURE

The disclosure relates generally to ion implantation apparatus and more particularly to high energy beamline ion implanters.

BACKGROUND OF THE DISCLOSURE

Ion implantation is a process of introducing dopants or impurities into a substrate via ion bombardment. Ion implantation systems may comprise an ion source and a series of beam-line components. The ion source may comprise a chamber where ions are generated. The ion source may also comprise a power source and an extraction electrode assembly disposed adjacent the chamber. The beam-line components, may include, for example, a mass analyzer, a first acceleration or deceleration stage, a collimator, and a second acceleration or deceleration stage. Much like a series of optical lenses for manipulating a light beam, the beam-line components can filter, focus, and manipulate ions or ion beam having particular species, shape, energy, and/or other qualities. The ion beam passes through the beam-line components and may be directed toward a substrate mounted on a platen or clamp.

Implantation apparatus capable of generating ion energies of approximately 1 MeV or greater are often referred to as high energy ion implanters, or high energy ion implantation systems. One type of high energy ion implanter uses as ion acceleration stage a linear accelerator, or LINAC, where a series of electrodes arranged as tubes conduct and accelerate the ion beam to increasingly higher energy along the succession of tubes, where the electrodes receive an RF voltage signal. Known (RF) LINACs are driven by an RF voltage applied at frequencies between 13.56 MHz-120 MHz.

In known LINACs (for the purposes of brevity, the term LINAC as used herein may refer to an RF LINAC using RF signals to accelerate an ion beam) in order to reach a targeted final energy, such as one MeV, several MeV, or greater, the ion beam may be accelerated in multiple acceleration stages. Each successive stage of the LINAC may receive the ion beam at increasingly higher energy, and accelerate the ion beam to still higher energy. A given acceleration stage of a LINAC may employ a so-called double gap configuration with one RF powered electrode, or a so-called triple gap configuration, with two RF powered electrodes.

A given acceleration stage also may include a resonator, to drive the RF electrodes with an RF voltage at the chosen RF frequency. Examples of known configurations for resonators include solenoidal resonators having a solenoidal coil generally defining a circular cylindrical shape which coil is surrounded by an electrically grounded cylindrical resonator can (RF enclosure). From an electromagnetic point of view, the resonator is an RLC oscillating circuit comprising of the coil as inductive element and the resonator can as capacitive element. At resonance, the energy is transformed periodically from magnetic energy stored in the coil into electrostatic energy as a voltage difference between the powered RF electrodes. In these solenoidal configurations, an exciter coil is provided inside the resonator can but outside the resonator coil to generate an RF signal that is magnetically coupled to the resonator coil. In particular, in the resonant RF cavity, RF energy is transferred from an RF generator to the RLC oscillating circuit. For a given input RF power, the higher the shunt impedance ($Z_{sh}$) of the resonator the higher the available acceleration voltage. The necessary RF energy is transferred from the RF generator to the RLC circuit by an RF exciter (exciter). In operation of the resonant cavity the exciter plays a double role: i) to match an output impedance of the RF generator (which impedance may be 50Ω) and, ii) to maximize the power transfer from the RF generator to the RLC circuit.

Recently, so-called toroidal resonators have been proposed for use in acceleration stages, where a resonator coil defines a toroid shape and the surrounding can (cavity) has a cylindrical shape. This configuration may generate a closed magnetic field topology within the resonator. In this configuration, the placement of the exciter may need adjustment compared to known solenoidal designs, since the magnetic field is generally enclosed within the loops of the resonator coil.

With respect to these and other considerations the present disclosure is provided.

BRIEF SUMMARY an exciter for a high frequency resonator is provided. The exciter may include an exciter coil inner portion, extending along an exciter axis, an exciter coil loop, disposed at a distal end of the exciter coil inner portion. The exciter may also include a drive mechanism, including at least a rotation component to rotate the exciter coil loop around the exciter axis.

In another embodiment, a resonator for a linear accelerator is provided. The resonator may include a toroidal resonator coil that defines a toroidal shape and an exciter, disposed at least partially within the toroidal resonator coil. The exciter may include an exciter coil inner portion, extending along an exciter axis, an exciter coil loop, disposed at a distal end of the exciter coil inner portion. The exciter may also have a drive mechanism, including at least a rotation component to rotate the exciter coil loop around the exciter axis.

In a further embodiment, a method of operating a linear accelerator is provided. The method may include sending RF power to an exciter of an RF resonator in the linear accelerator, where the RF resonator comprises a toroidal resonator coil and a resonator can, and where the exciter comprises an exciter loop that is disposed within the toroidal resonator coil. The method may further include conducting an ion beam through the linear accelerator, and rotating the exciter loop while the ion beam is conducted through the linear accelerator, wherein a power coupling between the exciter and the toroidal resonator coil is adjusted.

Figure 1A:
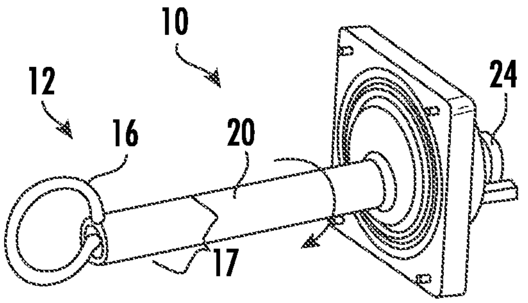
FIG. 1A-1F show different views of an exemplary apparatus, according to embodiments of the disclosure.
Figure 1B:
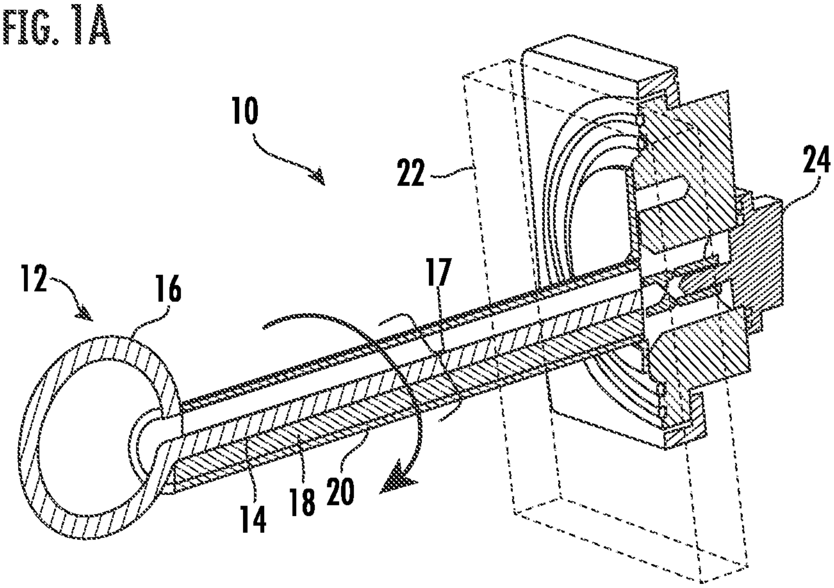

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

An apparatus, system and method in accordance with the present disclosure will now be described more fully hereinafter with reference to the accompanying drawings, where embodiments of the system and method are shown. The system and method may be embodied in many different forms and are not be construed as being limited to the embodiments set forth herein. Instead, these embodiments are provided so this disclosure will be thorough and complete, and will fully convey the scope of the system and method to those skilled in the art.

Terms such as "top," "bottom," "upper," "lower," "vertical," "horizontal," "lateral," and "longitudinal" may be used herein to describe the relative placement and orientation of these components and their constituent parts, with respect to the geometry and orientation of a component of a semiconductor manufacturing device as appearing in the figures. The terminology may include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

Provided herein are approaches for RF resonators, and in particular for improved high energy ion implantation systems and components, based upon a beamline architecture using linear accelerators. For brevity, an ion implantation system may also be referred to herein as an "ion implanter." Various embodiments entail novel approaches that provide the capability of flexibly adjusting the effective drift length within acceleration stages of a linear accelerator.

Figure 1C:
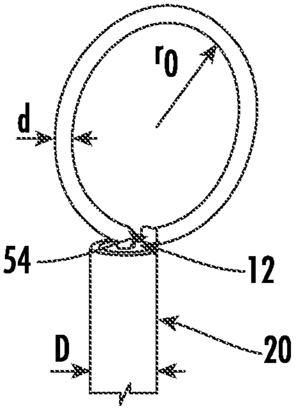
Figure 1D:
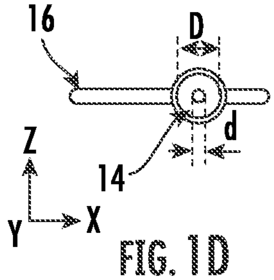
Figure 1E:
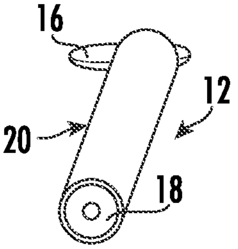
Figure 1F:
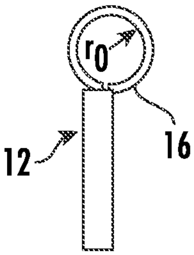

FIG. 1A-1F shows different views an exemplary apparatus, referred to herein as exciter 10. In particular, in addition to FIGS. 1A, 1B, discussed below, FIG. 1C shows details of a portion of the exciter 10, FIG. 1D shows an end view of the exciter 10, FIG. 1E shows a perspective view of the exciter 10, while FIG. 1F shows a side view of the exciter 10. The exciter 10 may be suitable for use in a high frequency resonator, such as an RF resonator of a LINAC, where excitation frequency may span the MHz range. As shown in FIG. 1A, the exciter 10 includes an exciter coil 12, formed of a suitable conductor such as a high conductivity metal or metal alloy, as well as an exciter shaft 17. As detailed in FIG. 1B, the exciter shaft 17 includes a powered leg, shown as exciter coil inner portion 14, insulating sleeve 18, and a grounded leg, shown as conductive sleeve 20.

The exciter shaft 17 may extend along an exciter axis, in this case defined as parallel to the Y-axis of the Cartesian coordinate system shown. The exciter coil 12 may further include an exciter loop 16, disposed at a distal end of the exciter coil inner portion 14. Thus, part of the exciter coil 12 is formed in the shat 17, including the exciter coil inner portion 14 and conductive sleeve 20, while part of the exciter coil (exciter coil loop 16) extends beyond the exciter shaft 17.

The exciter coil loop 16 may define a circular shape that lies within a given plane, such as the X-Y plane. On a first end of the exciter coil loop 16 is connected to the distal end of the exciter coil inner portion 14, as shown, while on a second end, the exciter coil loop 16 is connected to conductive sleeve 20. This configuration allows the insulating sleeve 18 and exciter coil inner portion to be passed through a chamber wall 22 that may house the exciter coil 12, as well as associated hardware of a resonator.

As further shown in FIG. 1A, the exciter 10 may include a stage 24, which stage may incorporate a drive mechanism that includes at least a rotation component (not separately shown), to rotate the exciter coil loop 16 around the exciter axis (Y-axis). In some examples, the drive mechanism of the stage 24 may further include a translation component (not separately shown), to move the exciter coil loop 16 along a first direction parallel to the exciter axis, in other words, along the Y-axis. As such, the orientation and position of the exciter coil loop 16 may be adjusted with respect to a resonator coil within a chamber housing the exciter coil loop 16. Advantages of this adjustability will be discussed further below.

Figure 2A:
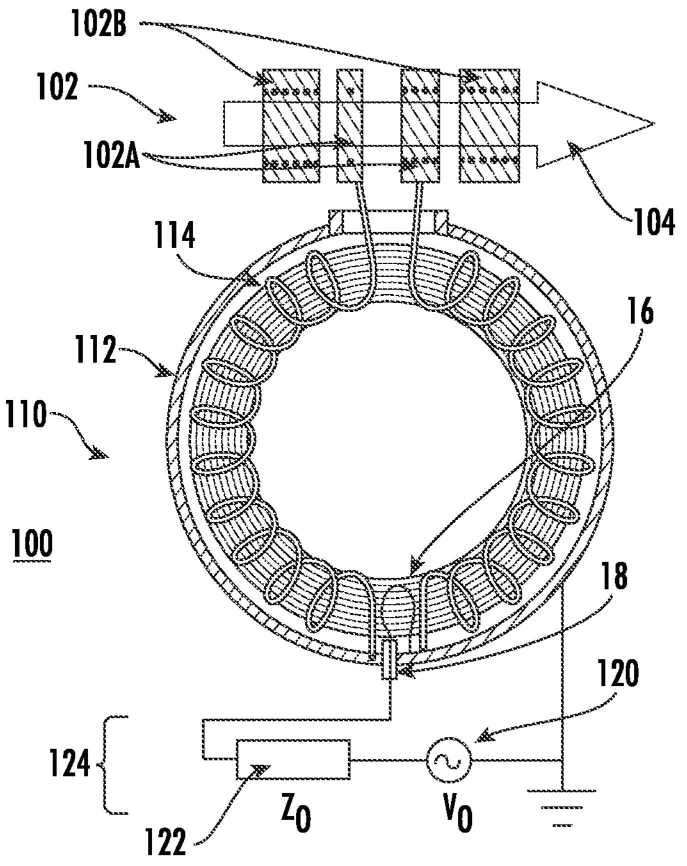
FIG. 2A presents a detailed front view of an embodiment of toroidal acceleration stage of a linear accelerator.
Figure 8:
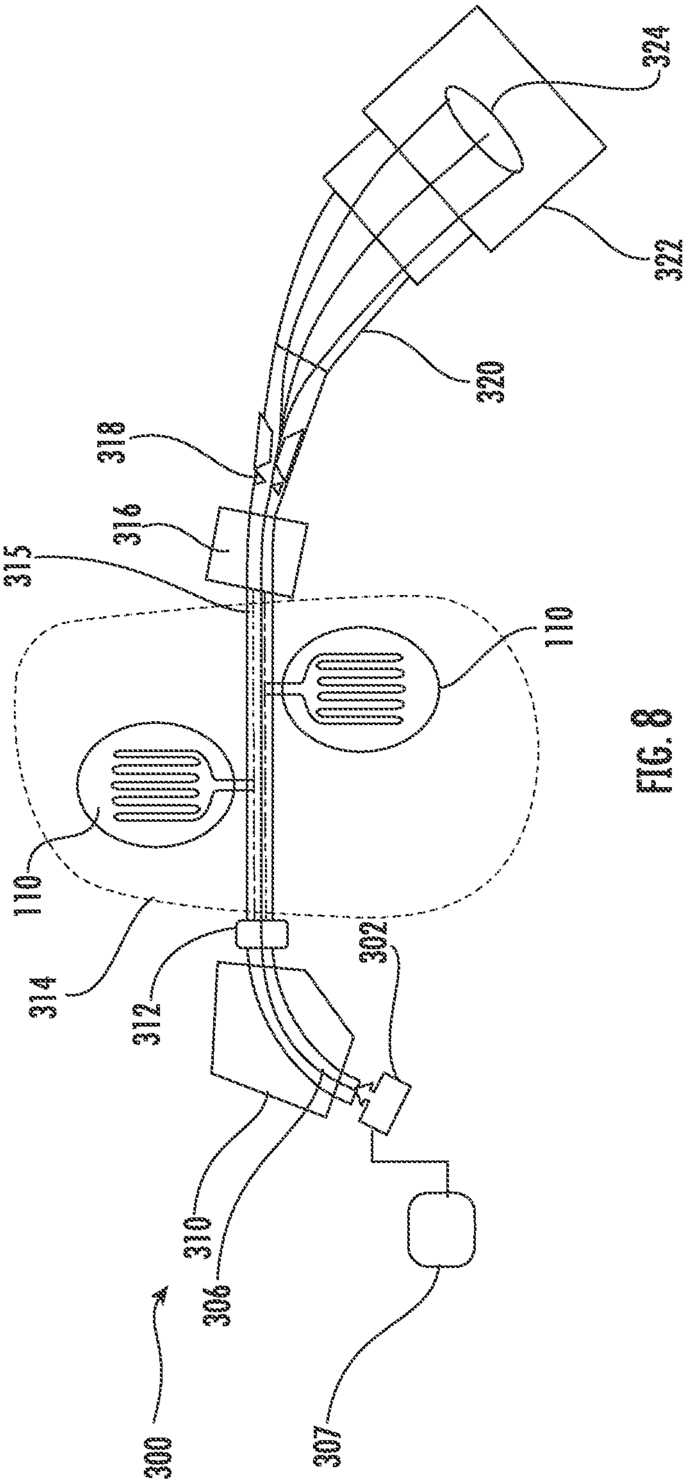
FIG. 8 depicts a schematic of an ion implanter apparatus, according to embodiments of the disclosure.

FIG. 2A presents a detailed front view of an embodiment of an acceleration stage 100 of a linear accelerator. The acceleration stage 100 includes a drift tube assembly 102 and associated resonator, shown as resonator 110, for accelerating an ion beam 104 in a linear accelerator. As shown in FIG. 8, discussed below, the resonator 110 may be implemented in a plurality of acceleration stages of a linear accelerator 314 for accelerating an ion beam 306 in an ion implanter 300.

In the embodiment of FIG. 2A, the drift tube assembly 102 includes an upstream grounded drift tube, and a downstream grounded drift tube, labeled similarly as grounded drift tube electrodes 102B. The drift tube assembly 102 further includes a pair of RF drift tube electrodes, shown as RF drift tube electrodes 102A, separated by a gap therebetween. Collectively, the RF drift tube electrodes 102A and grounded drift tube electrodes 102B define a triple gap configuration.

The RF drift tube electrodes 102A are driven by a resonator 110. The resonator 110 includes an RF enclosure 112 to house a toroidal resonator coil, referred to as toroidal coil 114. The toroidal coil 114 and similar resonator coils are described in detail in the embodiments to follow. In brief, the exciter coil 12 may be arranged to receive RF power as part of an RF power delivery assembly, shown as the rf circuitry 124, including an RF generator 120 and impedance element 122. While not shown in the figures, the resonator 110 or similar resonators, as described below, may include a capacitive tuner, located externally to the toroidal coil 114 but inside of a resonator can (rf enclosure 112). In various non-limiting embodiments, the capacitive tuner may be movable, in a manner to adjust gross capacitance of the RLC circuit formed by the toroidal coil 114 and the resonator can (RF enclosure 112).

Figures 3A, 3B, 3C:
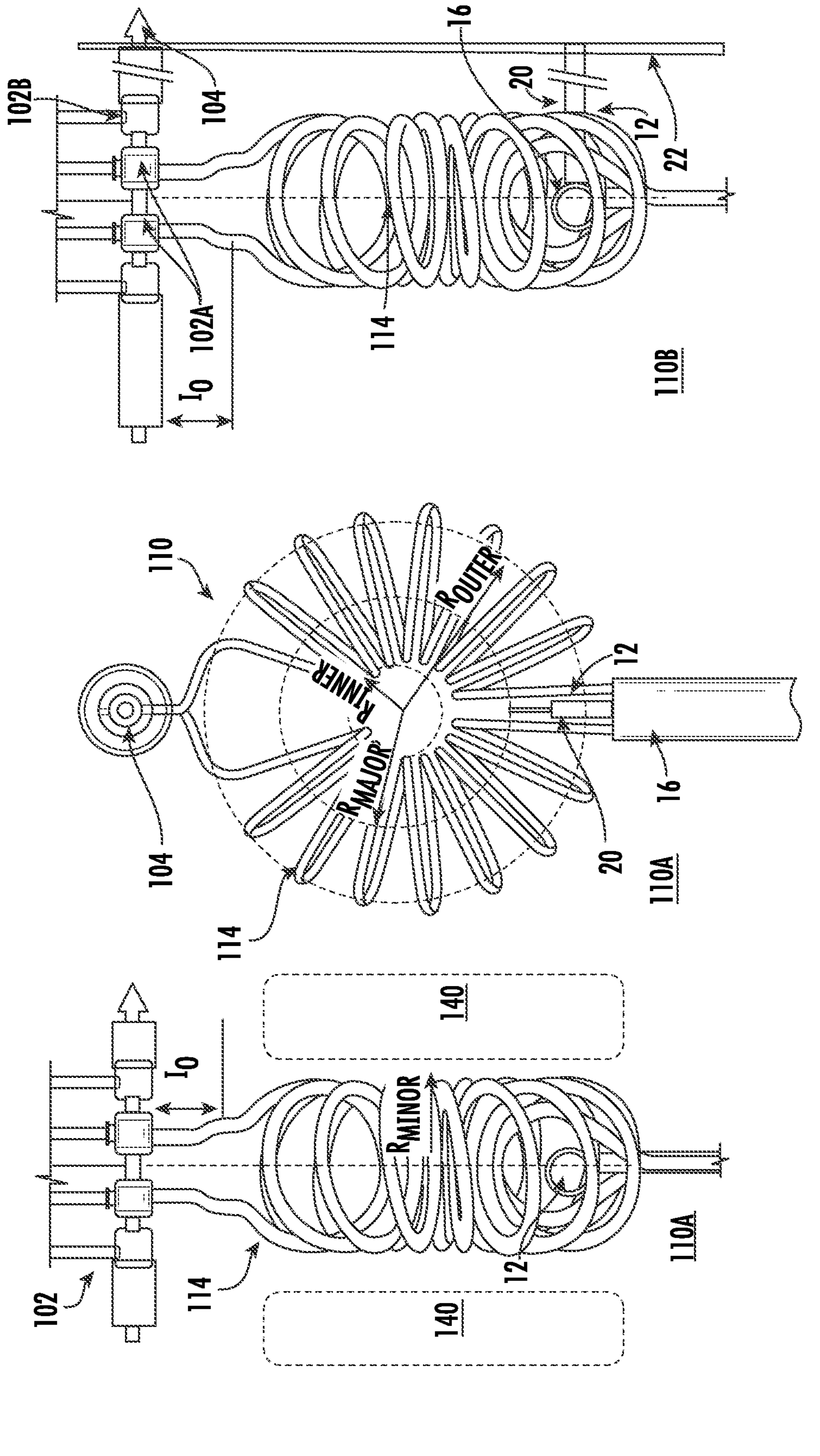
FIG. 3A and FIG. 3B, show a side view, and end view, respectively, for a resonator, according to an embodiment of the disclosure.
FIG. 3C shows a side view for another resonator, according to another embodiment of the disclosure.

Moreover, as shown in FIG. 2A, and in the figures to follow, according to various non-limiting embodiments, the resonator 110 and similar resonators may be applied to triple gap accelerator configuration. Besides the novel configuration of exciter 10, a difference over known LINACs in these embodiments is that the resonator 110, resonator 110A and resonator 110B (which resonators are shown in FIGS. 3A-C) deliver voltage to the drift tube assembly 102 via a toroidal coil 114, as opposed to solenoidal (or helical) coils of known triple gap accelerator stages.

The exciter coil 12 and toroidal coil 114 in conjunction with the RF enclosure 112 act to generate RF voltages at the RF drift tube electrodes 102A. To obtain the relationships between the input RF power and the voltage generated on the accelerating electrodes (RF drift tube electrodes 102A), the resonant cavity including the exciter coil 12, toroidal coil 114, and the RF enclosure 112 is modelled as a lumped element circuit. Using Thevenin theorem, the RF generator circuit and resonator circuit can be transformed into a single circuit. The equivalent mutual impedance $Z_M$ can be written as $$Z_M = i\omega L_{coil} + \omega^2 M/(Z_0 + i\omega L_{excit}) \tag{1}$$

and similarly, the equivalent RF voltage $V_M$ is given as $$V_M = V_0 \omega M/(Z_0 + i\omega L_{excit}) \tag{2}$$

where $i^2=-1$, $\omega=2\pi f$ is angular frequency, $V_0$ and $Z_0$ are the output voltage and impedance of the rf generator, M is mutual inductance of the exciter coil and resonator coil. As can be seen in eq. (2) the power transfer efficiency (which efficiency scales with the square of the voltage) depends on the coupling between the coils, which coupling is a function of the size, structure, physical spacing, relative location, and the properties of the environment surrounding the coils. In a simplest form, the mutual inductance for two concentric coils is given by the Maxwell formula.

$$M = 4\pi\sqrt{Aa}[(2/k - k)F - 2E/k] \tag{3}$$

with $$k = 2\sqrt{Aa}/\sqrt{(A+a)^2 + s^2} \tag{4}$$

where A and a are the radii of the circular coils, s the distance between their centers, and F, and E are the complete elliptic integrals of the first kind and second kind, respectively.

Figure 2B:
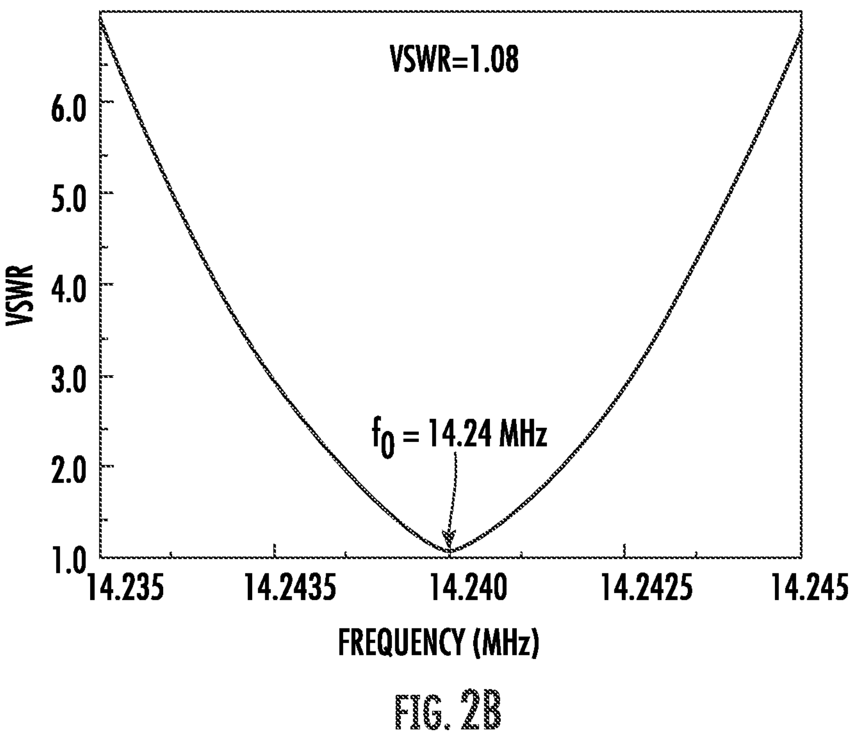
FIG. 2B illustrates dependence of VSWR (Voltage Standing Wave Ratio) on excitation frequency.

As coupling between an exciter coil and resonator coil depends on the amount of magnetic flux linkage between the exciter coil and resonator coil, for a given size of the resonator coil an optimum dimension of the exciter coil exists where the effect of coupling is maximum. In order to cover a wide range of frequencies, the exciter coil will have a high bandwidth of operation. Therefore, according to embodiments of the disclosure, the exciter coil 12 is designed as a low Q factor coil, meaning a low inductance coil. Thus, as shown in FIGS. 1A-1F, the exciter coil 12 may be designed as a one loop circular coil of radius $r_0$. The exciter coil loop 16 in particular may be formed of a conductive metal, such as a silver-plated copper wire of diameter d. Similar to a coaxial cable, the conductive sleeve 20 ensures a return path to ground and also screens the exciter coil inner portion 14 from RF interference. According to embodiments of the disclosure, the diameters of the exciter coil inner portion 14, insulating sleeve 18, and conductive sleeve 20 are chosen such that the exciter coil 12 characteristic impedance will match an RF generator output impedance. Thus for an rf generator of impedance 50Ω(most common):

$$Z_{ch} = \frac{1}{2\pi}\sqrt{\frac{\mu_0}{\epsilon_0\epsilon_r}}\ln\frac{D}{d} = 50\,\Omega \tag{5}$$

where $\mu_0$ and $\epsilon_0$ stand for magnetic permeability and dielectric permittivity of free space and $\epsilon_r$ for relative dielectric permittivity of the insulating sleeve material. Depending on the geometrical characteristics of the exciter a matching material can be chosen as insulator: air ($\epsilon_r$=1), PTFE ($\epsilon_r$=2), quartz ($\epsilon_r$=3.7), alumina ($\epsilon_r$=9.8) or other ceramics. In general, in RF electronics the efficiency of power transmission from the generator to the load is characterized by a Voltage Standing Wave Ratio (VSWR), which parameter is the ratio between the amplitudes of the reflected voltage wave and forward voltage wave. As shown in FIG. 2B, VSWR is a sharp function of frequency and can take values between 1 (perfect transmission) and ∞ (zero transmission). This parameter is related to power transfer:

$$P_r/P_f = ((\mathrm{VSWR}-1)/(\mathrm{VSWR}+1))^2 \tag{6}$$

where $P_r$, $P_f$ stand for the reflected and forward power, respectively. In one embodiment, by proper design of the exciter coil, the VSWR may be minimized to approach a value of 1. For the case depicted in FIG. 2B where VSWR=1.08 from Eq. 6, the value of reflected power represents just 0.15% of the forward power.

While the exciter coil 12 may be used to drive a resonator coil of any shape, in the present embodiments, such as in FIG. 2A, the resonator coil is a toroidal resonator. As such, the magnetic flux 130 generated by the toroidal coil 114, for example, is totally enclosed by the resonator coil, in other words, the magnetic flux is confined inside the coil loops. As such, in accordance with embodiments of the disclosure, in order to provide the necessary flux linkage between magnetic flux generated by an exciter coil and the magnetic flux of the toroidal resonator coil, an exciter coil needs to be inserted between the loops of a toroidal resonator coil to power the toroidal resonator coil. On the other hand, the toroidal resonator configuration benefits from the fact that magnetic flux is contained inside the toroidal coil 114. This geometry avoids leakage of field lines outside the toroidal coil 114, and thus leads to less induced eddy currents in the RF enclosure 112 of the resonator, where the lesser eddy currents translate into smaller resistance of the RLC circuit and implicitly higher shunt impedance.

To illustrate examples of this insertion geometry of exciter coil within a resonator coil, FIG. 3A, FIG. 3B, and FIG. 3C provide examples of two different resonators, according to embodiments of the disclosure. In particular, FIG. 3A, FIG. 3B, show a side view, and end view, respectively, for a resonator 110A, according to an embodiment of the disclosure, while FIG. 3C shows a side view for another resonator, according to another embodiment of the disclosure. Each of these resonators uses a toroidal coil. As used herein, the term "toroidal coil" may refer to two separate coils that are mutually arranged to define a toroid shape, where each of the separate coils may form a part of the toroid shape, such as similar halves of the toroid. As shown more clearly in FIG. 3B, the toroidal coil 114 includes a plurality of loops or turns. The toroidal coil 114 includes two coils arranged as two halves, having N turns each, and constructed of a suitable conductor, such as silver plated copper tubing. The turns of each half of the toroidal coil 114 are wound in the same direction, enabling the phase difference between the voltage on powered drift tubes to be 180° (antiphase). At the upper part of the toroidal coil 114, the two ends of the toroidal coil 114 are extended by a length $l_0$ and passed through an opening (not shown) in the rf enclosure to for separate connection to two separate powered RF drift tube electrodes (RF electrodes 102A), described above. At the bottom part the loops of the toroidal coil 114 may be connected to a grounded enclosure wall (see chamber wall 22).

Turning first to FIG. 3C, a first insertion geometry is shown. The exciter coil 12 is inserted toward the bottom of the toroidal coil 114 with the center of the loop on the azimuthal axis of the toroid and equally spaced from the toroid legs. Said differently, the long axis of the exciter coil 12 extends along the Z-axis, orthogonal to the X-Y plane. Because the bottom legs of the toroidal coil are connected to the ground, this configuration reduces the risk of arcing between the exciter coil 12 and the toroidal coil 114. In addition, the exciter coil loop 16 may be symmetrically placed to ensure a balanced voltage on the two halves of the toroidal coil 114. A drawback of this configuration stems from the fact that the conductive sleeve 20 has to be passed through the loops of the toroidal coil 114 and then connected to the grounded chamber wall 1. While functional, this configuration introduces a voltage drop along the exciter coil 12, because the exciter shaft (meaning, in particular, the exciter coil inner portion 14) is relatively longer in order to be long enough to reach the chamber wall 22, and thus reduces the efficiency of the power transfer.

A more advantageous insertion geometry for exciter coil 12 is depicted in FIG. 3A and FIG. 3B. In this case the exciter coil 12 is inserted at the bottom of the system between the legs of the toroidal coil 114. The center of the exciter coil loop 16 is aligned on the azimuthal axis of the toroid (meaning the circle on the Oyz symmetry plane of the toroid, having a radius equal to major radius of the torus ($R_{Major}$) The conductive sleeve 20 is electrically connected to the grounded pedestal of the toroidal coil 114. While maintaining the low arcing risk and the balanced voltage, in this configuration the return path to ground is shortened. Consequently, the voltage drop on the exciter 10 is reduced, which reduction translates into better power transfer efficiency.

For an ideal case (no losses) the magnetic energy has been shown to convert entirely into electrostatic energy resulting in 1:1 energy conversion from the toroidal coil 114 (magnetic energy) to the accelerating ion (kinetic energy). However, in real systems there are losses limiting this energy conversion. In this case, the energy transfer is quantified by the shunt impedance ($Z_{sh}$) of the resonator. For the same amount of input power, as higher $Z_{sh}$ as higher the voltage generated on the accelerating electrodes. Theoretical analysis shows $Z_{sh}$ scales with inductance of the coil as $\sim L^{3/2}$ which relationship means the larger L becomes the larger is $Z_{sh}$. On other hand, because the cavity forms an RLC circuit the circuit will oscillate with a certain frequency, which frequency at resonance is $$f_0=1/2\pi\sqrt{LC} \quad (7)$$

where L is the inductance of the coil and C the capacitance of the system.

Figure 4A:
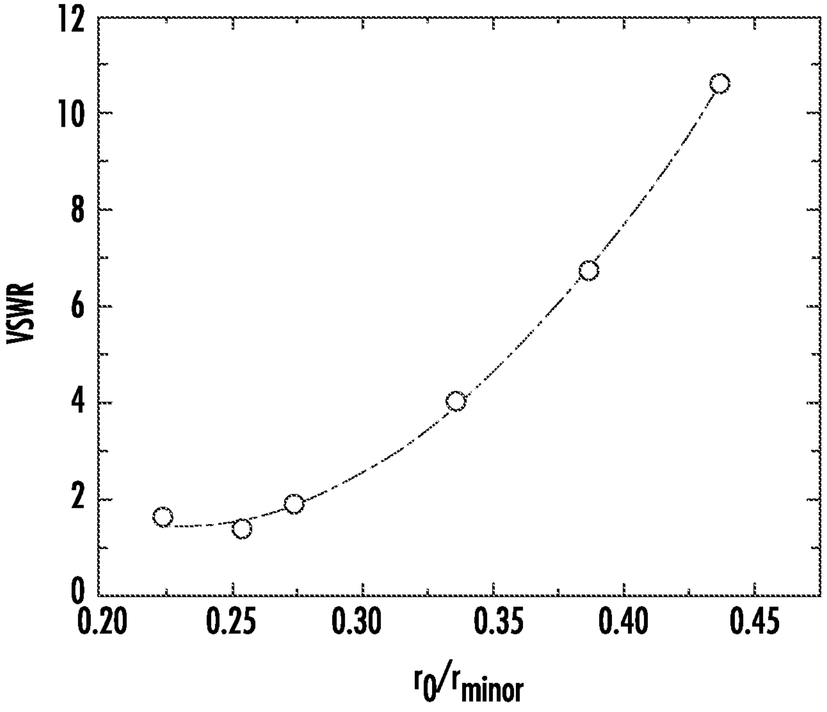
FIG. 4A and FIG. 4B illustrates electrical performance of a resonator as a function of ratio of exciter loop radius to minor radius of toroidal resonator coil.
Figure 4B:
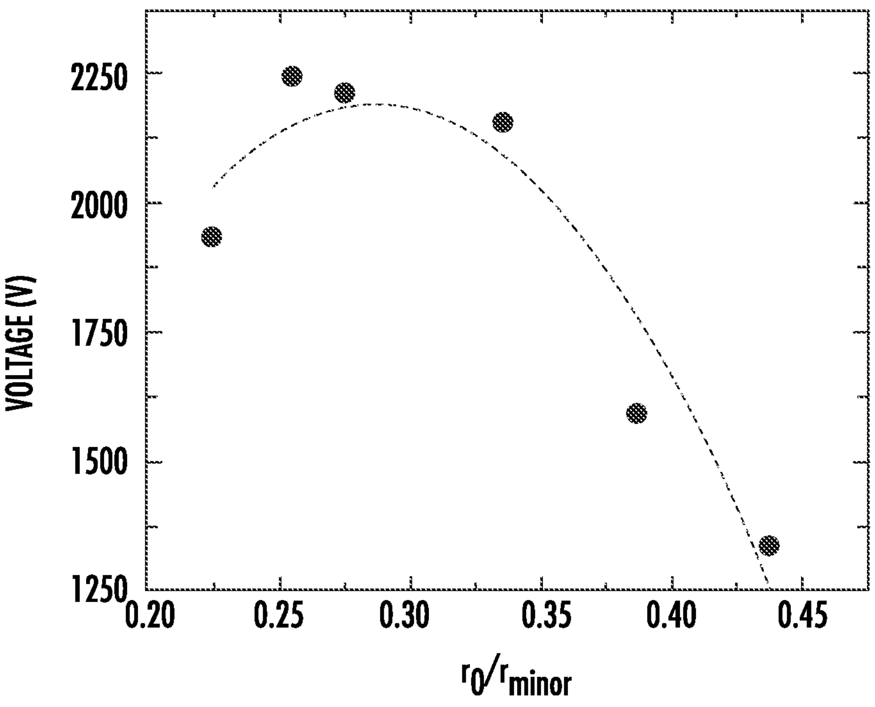

Therefore, the coil-can (enclosure) resonator system is designed to have an as-high-as-possible shunt impedance ($Z_{sh}$), and simultaneously a natural resonance frequency ($f_0$) as close as possible to the desired operating RF frequency (e.g., 13.56 MHz and 27.12 MHz). As noted above, the small departures of the resonant frequency from the operating frequency may be corrected with a capacitive tuning component (here, one possible location of a capacitive tuning component 140 is shown in the dashed lines), As shown by Eqs (3)-(4), the mutual coupling depends on the sizes and relative location of the coils. Therefore, for a given resonator coil geometry there will be an optimal size of the inductive RF exciter, meaning the exciter coil loop 16 diameter. The electrical behavior induced by a set of exciter coils having identical characteristic impedance ($Z_{ch}$) but different loop radii was modelled against the same resonator coil. As can be seen in FIG. 4A and FIG. 4B, HFSS (High Frequency Simulation Software) modelling results show that the optimal ratio of the exciter loop radius to toroid minor radius where the power transfer is maximum corresponds to a value of approximately 0.25. For this ratio, VSWR~1.1 (corresponding to 99.7% transferred power) and the voltage on the powered slits for 100 W input power in the exciter 10 is 2.25 kV. As described previously, in order to work properly and achieve the maximum power transfer and then conversion into maximum voltage on energized slits, the resonant frequency of the system must match the frequency of the RF generator.

In accordance with embodiments of the disclosure, the resonator may be firstly tuned for resonance in the absence of an ion beam. During operation due to thermal effects, the resonator frequency may drift from a designed value, requiring an operation to bring the resonator back to a resonance value. This return to resonance may be accomplished using a tuning system, including, for example, an adjustable capacitor. However, in the presence of beam, the resonator load impedance is changed as well, due to electrical resistance introduced by the beam. This impedance change will affect the power coupling, leading to a circumstance where the coupling of exciter loop to a resonator coil is not optimum. According to the present embodiments, the coupling of exciter 10 to the toroidal coil 114 may be adjusted with the provision of a movement mechanism for exciter 10, such as the drive mechanism of stage 24, discussed above. In other words, by rotating the exciter coil loop 16 around Oy axis, the coupling is readily changed, thus exposing more or less "effective" surface area, which change will maximize magnetic flux linkage between the exciter 10 and the toroidal coil 114.

Figure 5C:
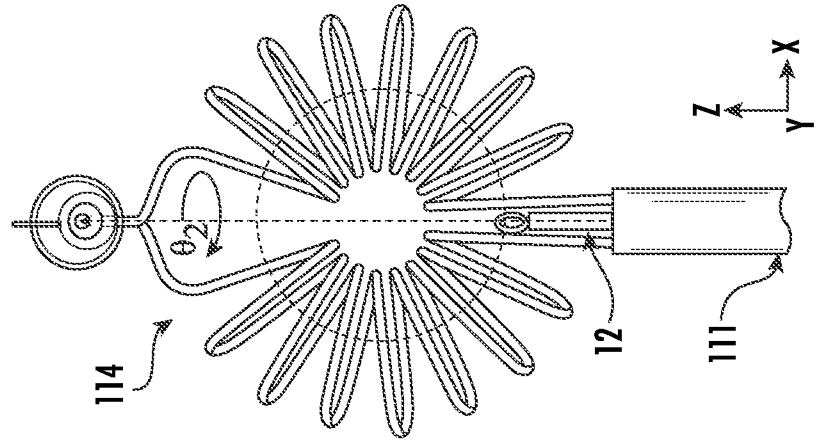
FIG. 5A, FIG. 5B and FIG. 5C, show an end view of a resonator operated in different rotation orientations of an exciter loop, according to embodiments of the disclosure; respectively, for an embodiment of a resonator.
Figure 5B:
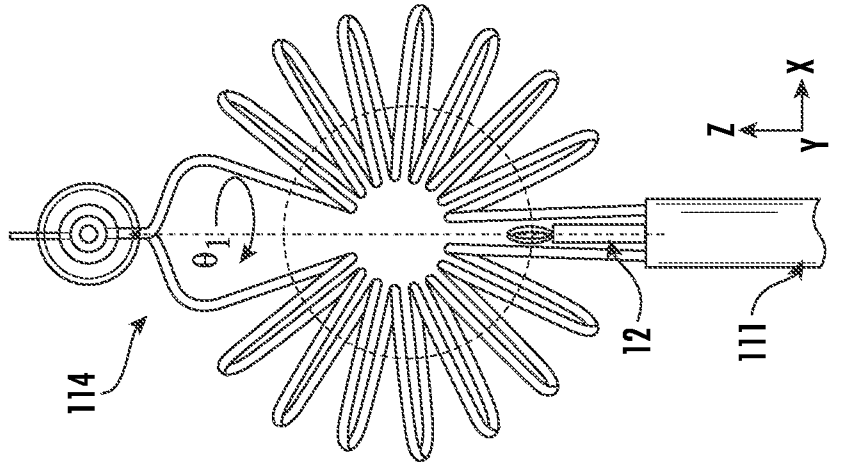
Figure 5A:
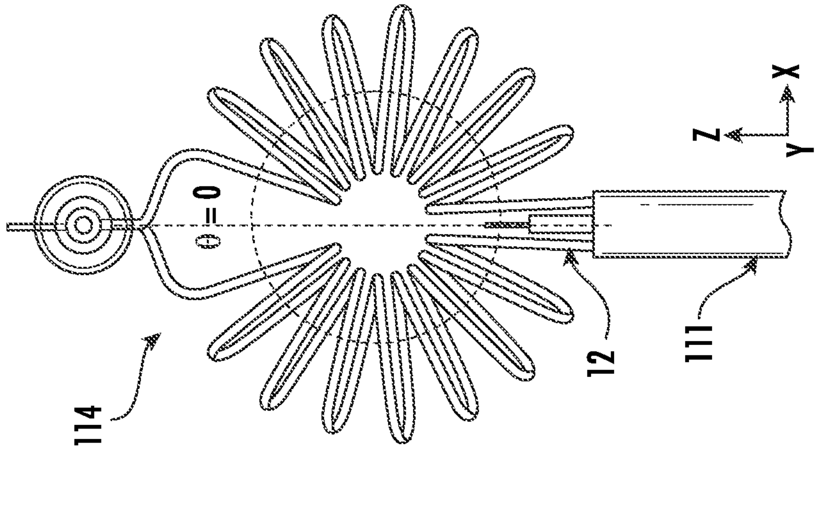

FIG. 5A, FIG. 5B and FIG. 5C, show an end view of a resonator operated in different rotation orientations of an exciter loop, according to embodiments of the disclosure; respectively, for an embodiment of a resonator. In particular, in FIGS. 5A, FIG. 5B, and FIG. 5C, the angle between the normal on the exciter loop surface and the tangent to the toroid azimuthal axis are varied from 0° to 15° and then to 30°, respectively.

Figure 6A:
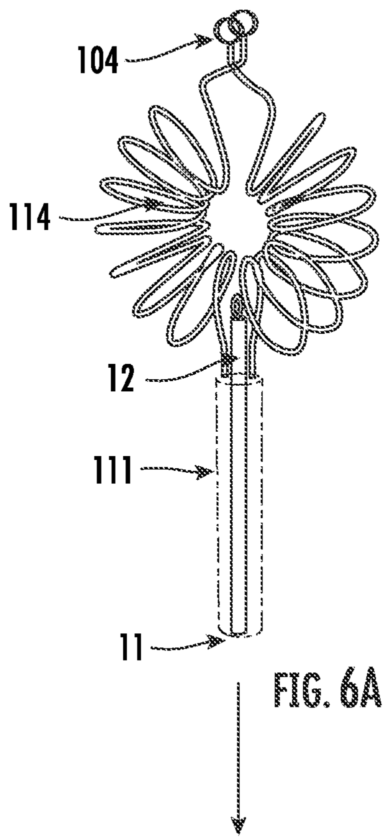
FIG. 6A and FIG. 6B show construction details of an embodiment of a rotating exciter.
Figure 6B:
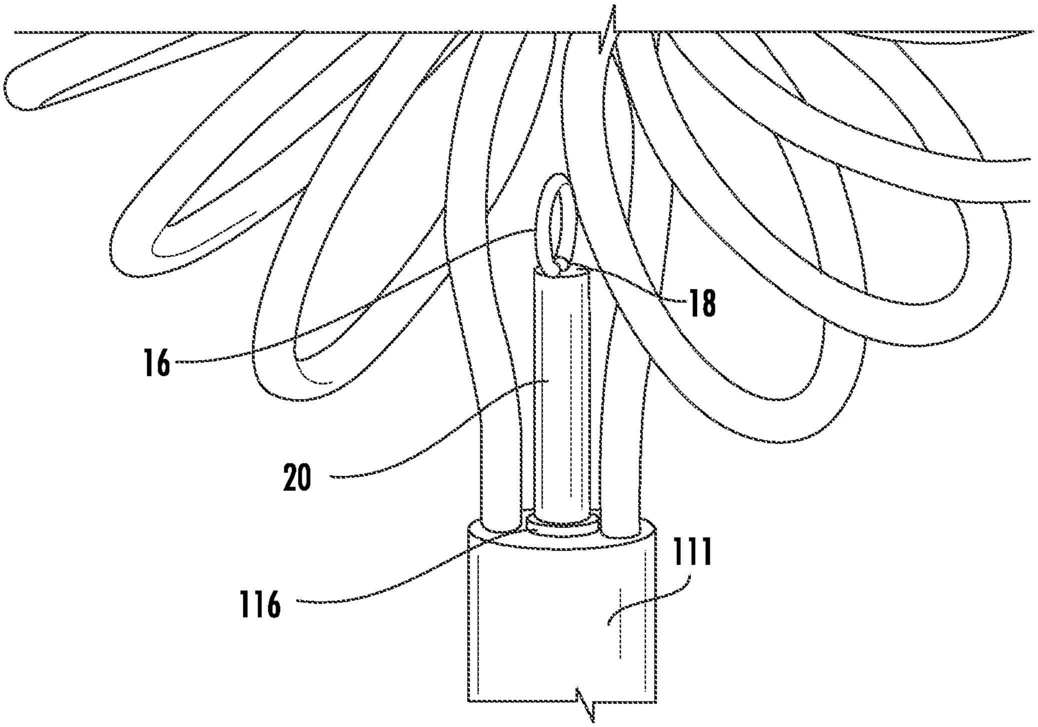

FIG. 6A and FIG. 6B shows construction details of an embodiment of a rotating exciter. Toroidal coil post 111 is hollow, having a concentric cylindrical hole of a diameter slightly larger than the diameter of the conductive sleeve 20 which concentric cylindrical hole spans all the way from the toroidal coil legs down to the chamber wall. The exciter shaft 17 (conductive sleeve 20, insulating sleeve 18, and exciter coil inner portion 14) is passed through and can rotate freely in the post cylindrical hole. At the bottom of the post, insulating sleeve 18 and powered leg (exciter coil inner portion 14) of the exciter coil 12 are passed through a chamber wall (not separately shown) and further to a stage 24, which configuration may ensure a dynamic connection with the RF generator 120 using a spring loaded electrical connection. Grounding connection between the conductive sleeve 20 and toroidal coil post 111 is ensured by a connection ring 116, which ring may be affixed, such as by a side screw to the conductive sleeve 20, where the connection ring has a diameter slightly larger than the post hole. In this fashion the connection ring 116 sits on the top portion of the toroidal coil post 111 and thus ensures electrical path to ground. The rotation of the exciter coil 12 may then be performed by a rotation stage outside the resonator chamber, as discussed above.

Figure 7A:
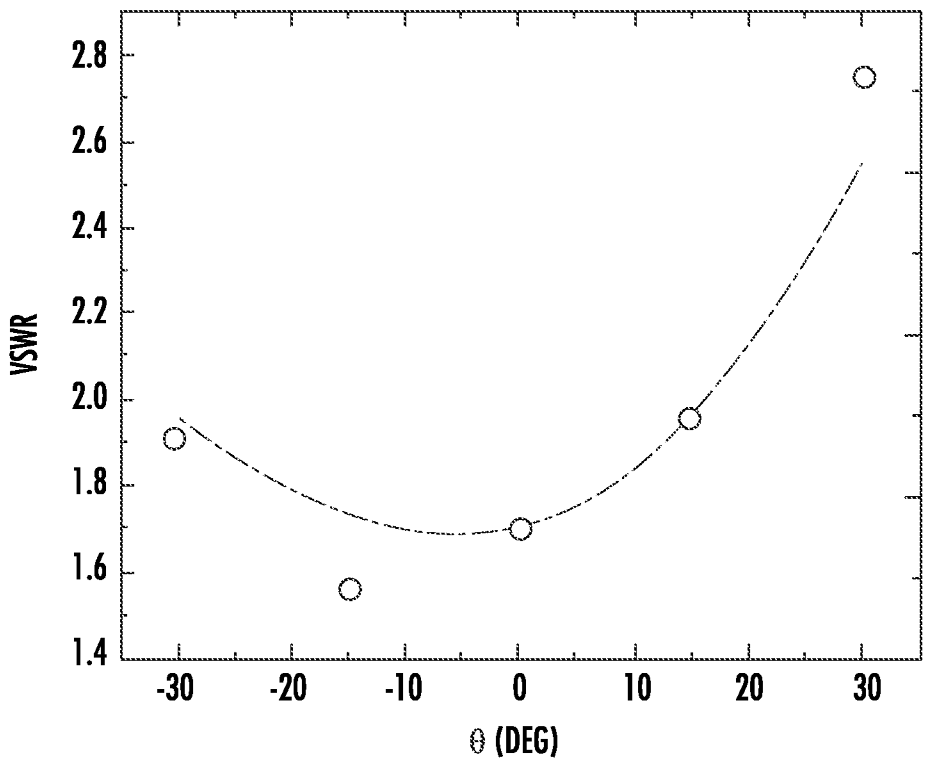
FIG. 7A and FIG. 7B present electrical behavior of a resonator as a function of orientation angle of an exciter loop, in accordance with embodiments of the disclosure.
Figure 7B:
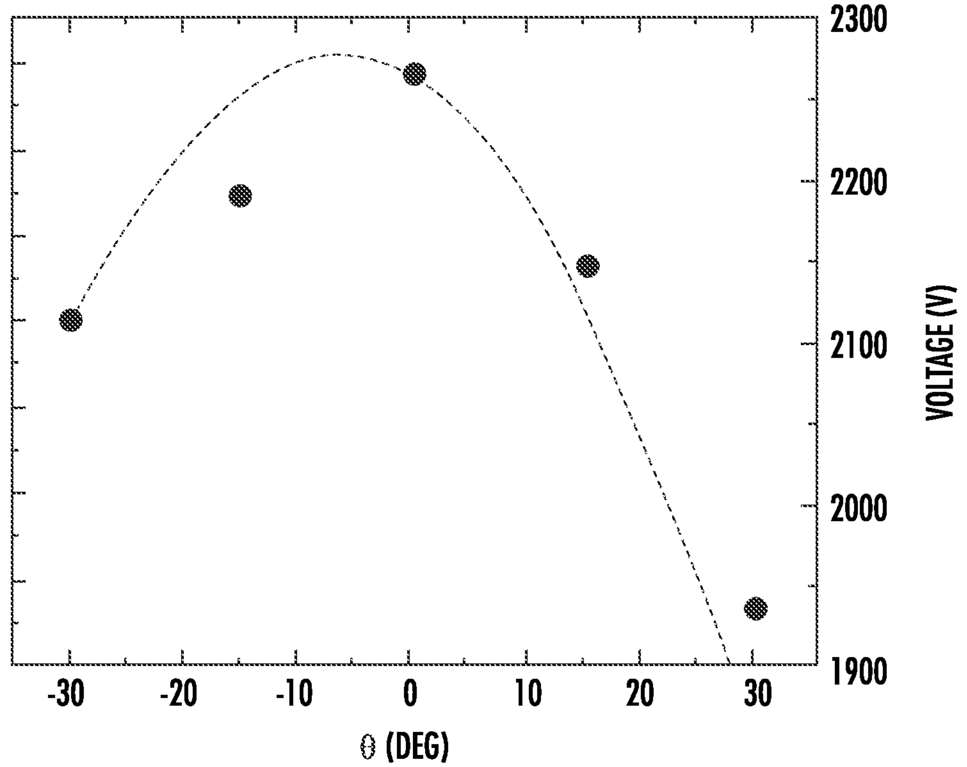

As depicted in the VSWR and voltage behavior of FIG. 7A and FIG. 7B, HFSS modelling results show for the particular $r_0/r_{min}$ ratio chosen in the model, the optimal value of the exciter coil orientation where a maximum power transfer is achieved is ≅7°. For this model, the maximum power transfer is 96.3% and the developed voltage is 2.27 kV for 100 W input power. Thus, by providing rotation capability, such as through a drive of a stage, the present embodiments facilitate facile tuning to maintain coupling of exciter and resonance coil in a given acceleration stage of a linear accelerator.

Ideally the center of the exciter coil loop 16 should align concentrically with the azimuthal axis of the toroid formed by a toroidal coil. However, small departures from symmetry of the two halves of the toroidal coil may a induce slight voltage imbalance on the powered drift tubes. In accordance with embodiments of the disclosure, this imbalance may be corrected by adjusting the insertion depth of the exciter coil 12. This adjusting may practically be achieved by moving the exciter coil loop 16 into the toroidal coil or withdrawing the exciter coil loop 16 from the toroidal coil to a new position, and subsequently fixing in the new position.

FIG. 8 depicts a schematic of an apparatus, according to embodiments of the disclosure. The ion implanter 300 includes a linear accelerator 314. The ion implanter 300, may represent a beamline ion implanter, with some elements not shown for clarity of explanation. The ion implanter 300 may include an ion source 302, and a gas box 307 as known in the art. The ion source 302 may include an extraction system including extraction components and filters (not shown) to generate an ion beam 306 at a first energy. Examples of suitable ion energy for the first ion energy range from 5 keV to 300 keV, while the embodiments are not limited in this context. To form a high energy ion beam, the ion implanter 300 includes various additional components for accelerating the ion beam 306.

The ion implanter 300 may include an analyzer 310, functioning to analyze the ion beam 306 as in known apparatus, by changing the trajectory of the ion beam 306, as shown. The ion implanter 300 may also include a buncher 312, and a linear accelerator 314 (shown in the dashed line), disposed downstream of the buncher 312, where the linear accelerator 314 is arranged to accelerate the ion beam 306 to form a high energy ion beam 315, greater than the ion energy of the ion beam 306, before entering the linear accelerator 314. The buncher 312 may receive the ion beam 306 as a continuous ion beam and output the ion beam 306 as a bunched ion beam to the linear accelerator 314. The linear accelerator 314 may include a plurality of acceleration stages, represented by the resonators 110, arranged in series, as shown. In various embodiments, the ion energy of the high energy ion beam 315 may represent the final ion energy for the ion beam 306, or approximately the final ion energy. In various embodiments, the ion implanter 300 may include additional components, such as filter magnet 316, a scanner 318, collimator 320, where the general functions of the scanner 318 and collimator 320 are well known and will not be described herein in further detail. As such, a high energy ion beam, represented by the high energy ion beam 315, may be delivered to an end station 322 for processing a substrate 324. Depending on the ionization state (single, double, triple, ionization) of the ionic species, non-limiting energy ranges for the high energy ion beam 315 include 500 keV-10 MeV, where the ion energy of the ion beam 306 is increased in steps through the various acceleration stages of the linear accelerator 314. In accordance with various embodiments of the disclosure, the acceleration stages of the linear accelerator 314 are powered by the resonators 110, where the design of resonators 110 may be in accordance with the embodiments of FIGS. 2A-7B.

Figure 9:
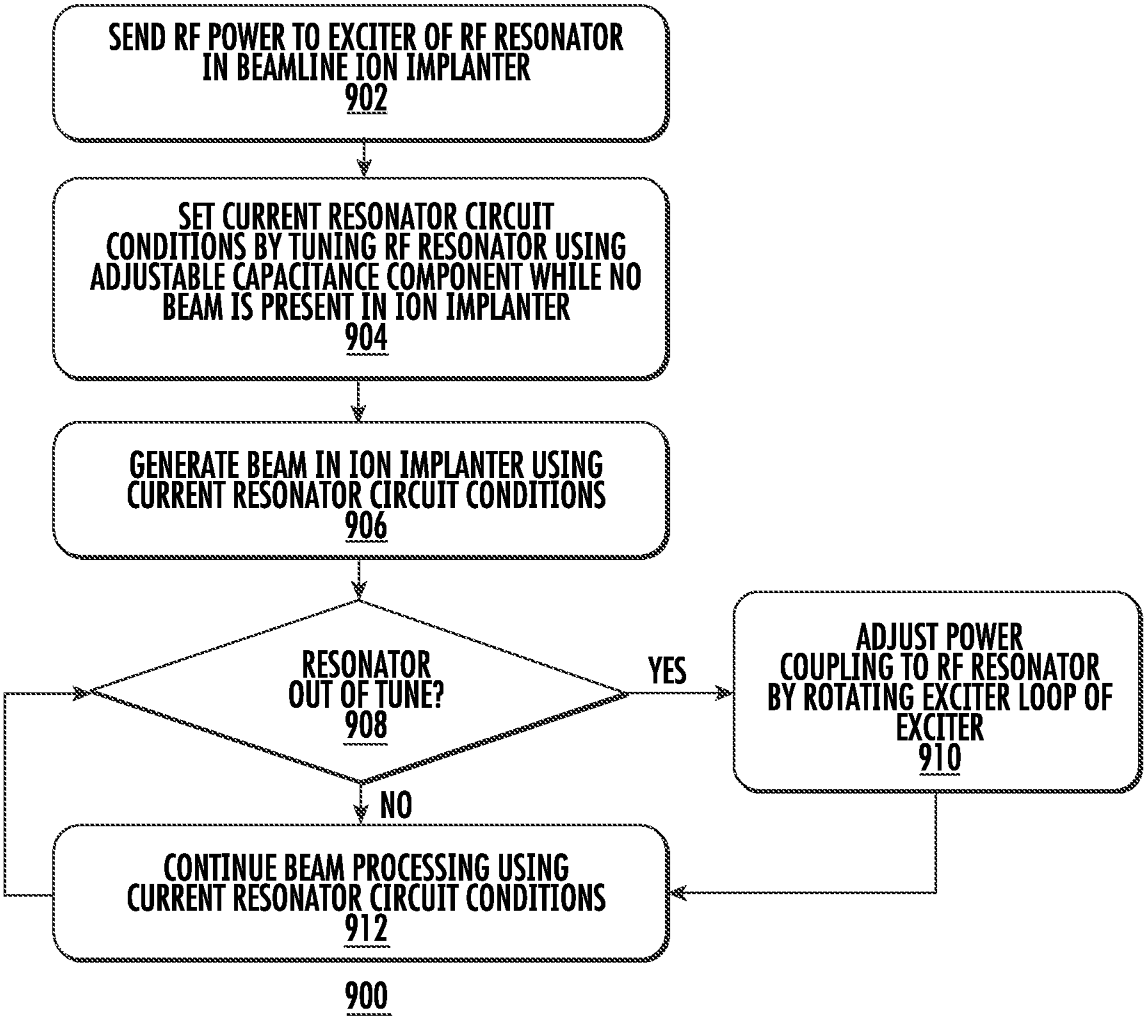
FIG. 9 depicts an exemplary process flow.

FIG. 9 depicts an exemplary process flow 900. At block 902, RF power is sent to an exciter of an RF resonator in a beamline ion implanter. The RF power may be sent from an RF power supply coupled to the exciter. In various embodiments, the RF resonator may be constructed with a toroidal resonator coil. In some embodiments, the RF resonator may be constructed with a solenoidal resonator coil. The exciter may include an exciter loop disposed within the toroidal resonator coil. In particular embodiments, the exciter loop may be centered on the azimuthal axis of the toroidal resonator coil.

At block 904, resonator conditions may be adjusted or set to tune the resonant frequency of the circuit formed by the RF power supply and resonator. The resonator conditions may be set by minimizing VSWR in one example. In particular, tuning may be accomplished by moving an adjustable capacitance component, such as a capacitor disposed in a resonance chamber housing the resonator coil and exciter loop.

At block 906, an ion beam is generated in a beamline ion implanter including a linear accelerator, using the current resonator circuit conditions, established at block 904.

At decision block 908, a determination is made as to whether the resonator is out of tune. For example, a relevant parameter such as the reflected power or VSWR may be monitored to see if the relevant parameter remains below a threshold. If so, the flow proceeds to block 910, where power coupling to the RF resonator is adjusted by rotating the exciter loop of the exciter. The flow then proceeds to block 912.

At block 912, beam processing is continued using the current resonator circuit conditions, where the current resonator circuit conditions may or may not represent conditions that are updated based upon the operation at block 910.

If at decision block 908, the resonator is not out of tune, the flow proceeds directly to block 912. After block 912, the flow may return to decision block 908 as beam processing continues. The flow loop between decision block 908 and block 912 may proceed while beam processing continues.

In view of the above, the present disclosure provides at least the following advantages. For one advantage, the configuration of exciter and resonator according to the present embodiments provides higher magnetic coupling efficiency and implicitly high power transfer compared with known resonators. At the same time the rotatable exciter configuration provides the advantage of another accessible tuning “knob” for adjusting the power transfer efficiency into a resonator.

While certain embodiments of the disclosure have been described herein, the disclosure is not limited thereto, as the disclosure is as broad in scope as the art will allow and the specification may be read likewise. Therefore, the above description is not to be construed as limiting. Those skilled in the art will envision other modifications within the scope and spirit of the claims appended hereto.

The invention claimed is:

1. A resonator for a linear accelerator, comprising:
- a resonator chamber;
- a resonator coil, disposed within the resonator chamber; and
- an exciter, disposed at least partially within the resonator chamber and further comprising:
- an exciter coil inner portion, extending along an exciter axis;
- an exciter coil loop, disposed at a distal end of the exciter coil inner portion; and
- a drive mechanism, the drive mechanism comprising at least a rotation component to rotate the exciter coil loop around the exciter axis.

2. The resonator of claim 1, the exciter further comprising an insulating sleeve, disposed around the exciter coil inner portion; and a conductive sleeve, disposed around the insulating sleeve, wherein the exciter coil loop has a first end, connected to the distal end of the exciter coil inner portion, and a second end, connected to the conductive sleeve.

3. The resonator of claim 2, wherein the exciter coil inner portion is coupled to receive an RF signal, and wherein the conductive sleeve is coupled to ground.

4. The resonator of claim 1, the drive mechanism further comprising a translation component, to move the exciter coil loop along a first direction parallel to the exciter axis.

5. The resonator of claim 1, further comprising a chamber wall that houses the resonator coil, wherein the exciter further comprises a stage that contains the drive mechanism, the stage being disposed outside the chamber wall.

6. The resonator of claim 1, wherein the resonator coil is a solenoidal resonator coil, wherein the exciter coil loop is disposed outside of the solenoidal resonator coil.

7. The resonator of claim 1, wherein the resonator coil is a toroidal resonator coil, wherein the exciter coil loop is disposed inside of the toroidal resonator coil.

8. An ion implanter, comprising:
- an ion source to generate an ion beam; and
- a linear accelerator disposed downstream of the ion source, wherein the linear accelerator is arranged to accelerate the ion beam, the linear accelerator comprising a plurality of stages, wherein a given stage of the plurality of stages comprises a resonator, the resonator comprising:
- a resonator chamber;
- a resonator coil, disposed within the resonator chamber; and
- an exciter, disposed within the resonator chamber and further comprising:
- an exciter coil inner portion, extending along an exciter axis;
- an exciter coil loop, disposed at a distal end of the exciter coil inner portion; and
- a drive mechanism, the drive mechanism comprising at least a rotation component to rotate the exciter coil loop around the exciter axis.

9. The ion implanter of claim 8, the exciter further comprising an insulating sleeve, disposed around the exciter coil inner portion; and a conductive sleeve, disposed around the insulating sleeve, wherein the exciter coil loop has a first end, connected to the distal end of the exciter coil inner portion, and a second end, connected to the conductive sleeve.

10. The ion implanter of claim 9, wherein the exciter coil inner portion is coupled to receive an RF signal, and wherein the conductive sleeve is coupled to ground.

11. The ion implanter of claim 8, the drive mechanism further comprising a translation component, to move the exciter coil loop along a first direction parallel to the exciter axis.

12. The ion implanter of claim 8, further comprising a chamber wall that houses the resonator coil, wherein the exciter further comprises a stage that contains the drive mechanism, the stage being disposed outside the chamber wall.

13. The ion implanter of claim 8, wherein the resonator coil is a solenoidal resonator coil, wherein the exciter coil loop is disposed outside of the solenoidal resonator coil.

14. The ion implanter of claim 8, wherein the resonator coil is a toroidal resonator coil, wherein the exciter coil loop is disposed inside of the toroidal resonator coil.

15. A resonator for a linear accelerator, comprising:
- a resonator chamber;
- a solenoidal resonator coil, disposed within the resonator chamber; and
- an exciter, disposed at least partially within the resonator chamber and outside the solenoidal resonator coil, the exciter further comprising:
- an exciter coil inner portion, extending along an exciter axis;
- an exciter coil loop, disposed at a distal end of the exciter coil inner portion; and
- a drive mechanism, the drive mechanism comprising at least a rotation component to rotate the exciter coil loop around the exciter axis, in order to adjust a coupling of power from the exciter loop to the solenoidal resonator coil.

16. The resonator of claim 15, the exciter further comprising an insulating sleeve, disposed around the exciter coil inner portion; and a conductive sleeve, disposed around the insulating sleeve, wherein the exciter coil loop has a first end, connected to the distal end of the exciter coil inner portion, and a second end, connected to the conductive sleeve.

17. The resonator of claim 16, wherein the exciter coil inner portion is coupled to receive an RF signal, and wherein the conductive sleeve is coupled to ground.

18. The resonator of claim 15, the drive mechanism further comprising a translation component, to move the exciter coil loop along a first direction parallel to the exciter axis.

19. The resonator of claim 15, further comprising a chamber wall that houses the solenoidal resonator coil, wherein the exciter further comprises a stage that contains the drive mechanism, the stage being disposed outside the chamber wall.

20. The resonator of claim 15, wherein the exciter coil loop is disposed outside of the solenoidal resonator coil.

* * * * *